United States Patent [19]
Ward

[11] Patent Number: 5,760,386
[45] Date of Patent: Jun. 2, 1998

[54] RECORDING OF IMAGES

[75] Inventor: Paul Courtenay Ward, Watford, United Kingdom

[73] Assignee: Eastman Kodak Company, Rochester, N.Y.

[21] Appl. No.: 634,318

[22] Filed: Apr. 18, 1996

[30] Foreign Application Priority Data

Nov. 23, 1995 [GB] United Kingdom ............. 9524319

[51] Int. Cl.⁶ ........................................... G06K 19/06
[52] U.S. Cl. .................................. 235/493; 235/488
[58] Field of Search ............................ 235/380, 449, 235/468, 488, 490, 493; 902/27; 283/72, 74, 75, 77, 78, 67, 68, 69, 70, 901

[56] References Cited

U.S. PATENT DOCUMENTS

| | | | |
|---|---|---|---|
| 4,132,350 | 1/1979 | Kubota et al. ................ | 235/488 |
| 5,321,751 | 6/1994 | Ray et al. .................... | 380/23 |
| 5,466,918 | 11/1995 | Ray et al. .................... | 235/380 |
| 5,505,494 | 4/1996 | Belluci et al. ................ | 283/75 |

*Primary Examiner*—F. L. Evans
*Attorney, Agent, or Firm*—William F. Noval

[57] ABSTRACT

This invention describes a process for improvements in security for personal identification documents, particularly for machine-readable passports. An image of a personal identifier of a holder of the document is stored as a highly-compressed digital image in a magnetic medium dispersed invisibly within the material of a visible print forming part of the document or within the body of the document itself. The document is then scanned magnetically at the place where identification is required and the stored image decompressed and displayed. This provides confirmation that the holder of the document is the person shown on the visible image, that the document has not been tampered with, and by checking the image code against a database, that the document was originated by the proper authority.

15 Claims, 1 Drawing Sheet

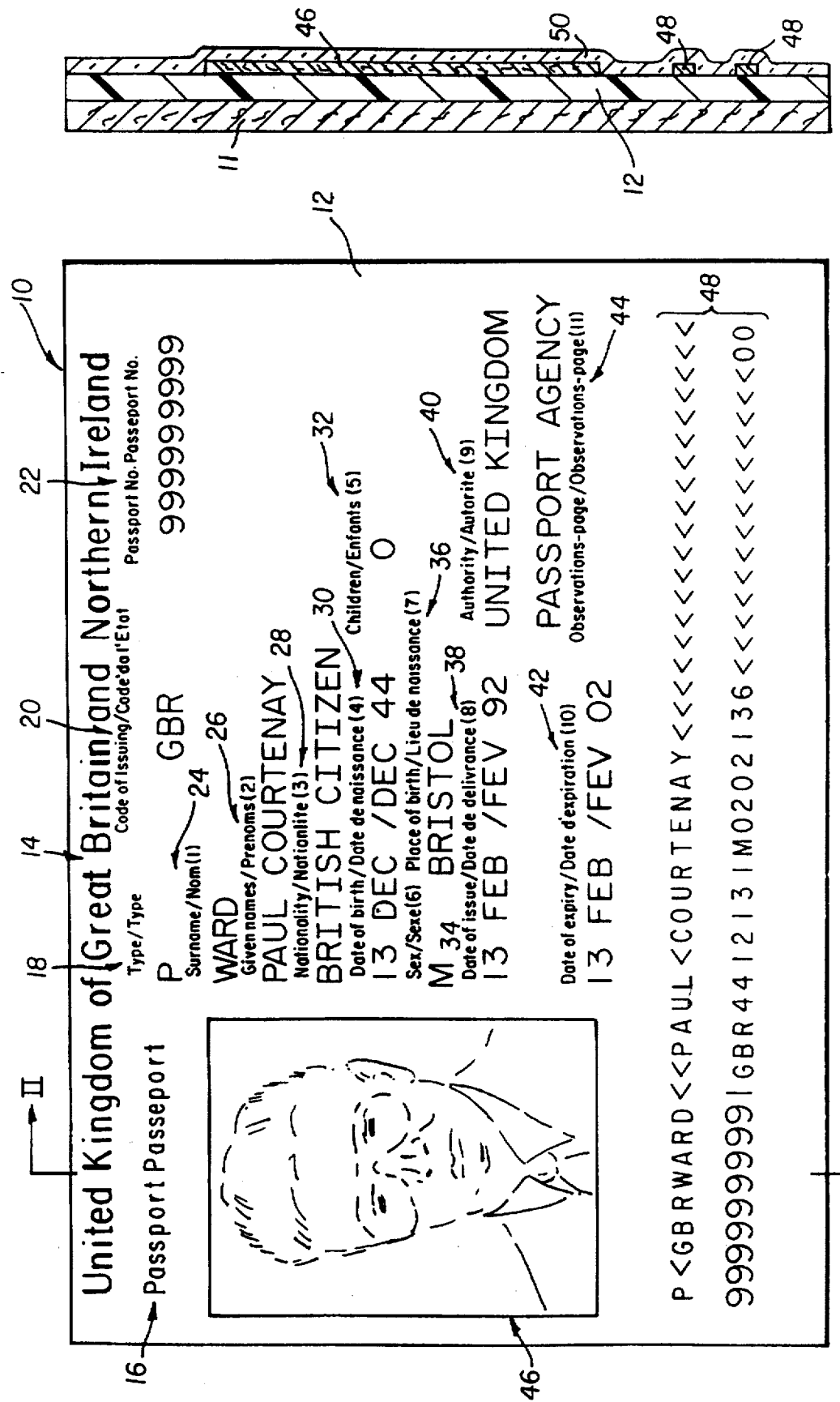

RECORDING OF IMAGES

FIELD OF THE INVENTION

The present invention relates to improvements in or relating to the recording of images, and is more particularly concerned with the recording of facial images used for identification documents such as passports.

BACKGROUND OF THE INVENTION

It is now possible to capture images in digital form and then process and print those images from the digital state.

U.S. Pat. No. 5,029,313 describes a system in which information can be exchanged between a variety of users of a photographic film material, for example, the film manufacturer, the camera user and the photofinisher. In U.S. Pat. No. 5,029,313 a virtually transparent magnetic layer is included as an additional layer in a colour negative film material. The information is recorded by each user in predetermined ones of a plurality of longitudinal magnetic tracks which begin and end within each individual frame. Each track is dedicated to the writing and reading of a predetermined set of parameters relating to the corresponding frame and is arranged to have a plurality of fields therein.

It has also been shown that very low concentrations of magnetic particles can be dispersed invisibly within, or on materials used for printing images and text with minimal effect on the optical properties of those materials. This is described in U.S. Pat. No. 5,395,743.

In U.S. Pat. No. 5,395,743, a transparent magnetic layer for film is disclosed in which the concentration of ferromagnetic particles is in range from $10^{-11}$ mg/µm$^3$ to $10^{-10}$ mg/µm$^3$.

It has also been shown that digitally recorded face images can be compressed to the order of 50 bytes and still be used for recognition when decompressed and displayed.

U.S. Pat. No. 5,321,751 describes a system in which image information relating to a holder of a credit card is embedded in the card. A photograph of the holder is converted to a digital image which is encoded into the card, for example, on a magnetic stripe or, in the case of a so-called 'smart' card, into an electronic storage system on the card. The encoded information is retrieved at a point of sale to display a picture of the card presenter on a monitor as a quick visual means for checking the validity of the account to which the card relates. In addition, a short digital code-word can be generated locally from the compressed image according to various algorithms and recorded therewith. As a further check, the code-word generated from the compressed image can be compared with a code-word generated from the compressed image which is stored centrally on a database to ensure that the document on which the image is stored was legitimately generated.

Problem to be Solved by the Invention

There is a growing problem of both tampering with and counterfeiting of passports, with a very high degree of expertise which makes the positive identification of the presenter of a passport at an Immigration station somewhat unreliable. A photographic image attached to a passport can be replaced with another image, or a whole passport generated illegally.

At present, there is no means for detecting passports which have been tampered with or have been illegally generated especially when such passports are produced with a great deal of skill.

Passports, for example, European Community passports, carry identification information for the holder of the passport on a machine-readable page which, being a European Standard, cannot be easily or quickly amended. This prevents the addition of any optically-readable information and improves security. However, although such passports cannot be easily tampered with, it is still possible to generate an entire passport illegally.

SUMMARY OF THE INVENTION

It is therefore an object of the present invention to provide an improved method of recording information relating to a passport holder which overcomes the problems associated with present methods of producing passports.

This method utilises a combination of three independent technologies, namely, digital image capture, image compression and magnetic recording in low particle concentration media, to provide improved security for passports or other identification documents.

In accordance with one aspect of the present invention, there is provided a method of recording an image of a unique personal identifier of a person on an identification document, the identification document including a region on to which the image is recorded, the method comprising the steps of:
   a) capturing an image of the unique personal identifier of the person to whom the identification document relates;
   b) compressing the captured image; and
   c) recording the compressed image in the region of the document;
   characterized in that the region includes a magnetic medium in which the compressed image is recorded, and into that the presence of the magnetic medium does not affect the visual appearance of the document.

Advantageously, the magnetic medium comprises magnetic particles formed on or in a thermal printer material. Alternatively, the magnetic particles may be formed in photographic material or in a laminating material. Moreover, the magnetic medium may comprise printing inks which are used to print the identification document.

Preferably, the unique personal identifier comprises an image of the person to whom the identification document is issued. However, it may also comprise a signature or a thumbprint of the person to whom the identification document is issued.

The compressed image may include a code-word which is derived in accordance with a predetermined rule.

It is preferred that the unique personal identifier may be captured using a digital camera. Alternatively, a print, negative or transparency bearing an image of the unique personal identifier of the person to whom the identification document relates, may be digitally scanned.

In accordance with another aspect of the present invention, there is provided an identification document including a compressed image of a unique personal identifier of a person to whom the document relates recorded in a magnetic medium.

Advantageous Effect of the Invention

The method of the present invention can readily be carried out in the United Kingdom without the need to change the standard which defines the layout of the European Community passport, thus improving the security of use of such passports.

It will be readily appreciated that the method of the present invention could also be implemented in other countries of the European Community and elsewhere.

In particular, by using digitally input images, significant improvements can be obtained when generating passports as all the relevant information, including the image, can be handled and stored together.

Moreover, digital systems are particularly appropriate for booth photography where a digital image of a prospective passport holder and his/her application for a passport could be transmitted directly to the passport authority by a modem, for example.

The compressed image can also be stored elsewhere on the passport other than in the picture area, for example, within the cover material or on another page. Such low concentration information would not be visible optically to the holder or on presentation for inspection, and could only be 'deciphered' or viewed using suitable equipment, for example, a magnetic viewer.

In accordance with the present invention, an image of the prospective passport holder's face may be recorded for the passport application with a digital camera, or by digitally scanning a print, negative or transparency bearing an image of that person's face. The prints for attachment to the passport and for record purposes are produced by suitable means, for example, a thermal printer. When the passport is assembled, as part of the process used by the Passport Office, the digital information captured by the camera or scanner is compressed and recorded in the magnetic medium which is either in the print material used for the prints to be attached to the passport or the passport itself. When the issued passport is presented by the holder for inspection at Passport Control, for example, the magnetically recorded information can be retrieved, decompressed, and displayed on a computer monitor for comparison with the visible image on the page, and the person presenting the passport.

A further security check can be made by comparing, for example, a 10-bit digital code-word which is dynamically derived from the compressed image code in accordance with a predetermined rule, for example, as described in U.S. Pat. No. 5,321,571, the same code-word being stored on and derived from a database in accordance with that same rule. This ensures that the presented passport, which although self-consistent, was originated by the correct authority, for example, the holders of the database or specifically authorised users thereof.

BRIEF DESCRIPTION OF THE DRAWINGS

For a better understanding of the present invention, reference will now be made, by way of example only, to the accompanying drawings, in which:

FIG. 1 illustrates an identification page of a passport; and

FIG. 2 is a section along lines II—II of FIG. 1.

DETAILED DESCRIPTION OF THE INVENTION

In accordance with one aspect of the present invention, an invisible recording of image of a passport holder is made on the machine-readable page of a European passport. However, the present invention is equally applicable to other identification documents where an image of the holder is recorded thereon as a photographic image or by some other means.

The technologies described in U.S. Pat. Nos. 5,321,751 and 5,395,743 above are both used to implement the present invention.

Recordal and verification of image information, stored digitally, of a holder of a credit card is described U.S. Pat. No. 5,321,751 which is incorporated herein by reference. In particular, a means of embedding image information into a credit card and using that information to assist in the card approval process is described. The present invention uses that image information and records it in another suitable medium, for example, in a magnetic medium provided in a passport or other identification document. As discussed previously, a digital image and a pre-approval code, as required, is recorded in a magnetic medium provided on an identification document in accordance with the disclosure of U.S. Pat. No. 5 321 751.

U.S. Pat. No. 5,395,743 mentioned above, and incorporated herein by reference, discloses a photographic element having a transparent magnetic recording layer. The magnetic recording layer comprises a transparent polymeric binder and ferromagnetic particles which provide a surface area greater than $30 m^2/mg$ and a coverage from $10^{-11}$ $mg/\mu m^3$ to $10^{-10}$ $mg/\mu m^3$. The polymeric binder contains up to about 25 weight percent, based on the weight of the polymeric binder, of a dispersant-cobinder comprising poly($C_{2-4}$-alkyleneimine) carrying at least two mono- or poly (carbonyl-$C_{1-7}$-alkyleneoxy) groups.

The polyalkyleneimine is capable of being cross-linked and is compatible with suitable solvents which permit both ease of milling and handling on a large scale. Furthermore, it is optically transparent and adds substantially no optical density in the visible spectrum—particularly in the range of 400 to 500 nm. Moreover, the polyalkyleneimine acts as both a dispersant for low solid dispersions while at the same time serves as a cobinder which can be cross-linked.

The ferromagnetic particles may comprise ferromagnetic iron oxides, such as $\gamma Fe_2O_3$ or $Fe_3O_4$, or $\gamma Fe_2O_3$ or $Fe_3O_4$ with Co, Zn or other metals in solid solution or surface treated, or ferromagnetic chromium dioxides, such as, $CrO_2$ or $CrO_2$ with metallic elements, for example, Li, Na, Sn, Pb, Fe, Co, Ni and Zn, or halogen atoms in solid solution. Ferromagnetic metal pigments with an oxide coating on their surface to improve their chemical stability or to improve dispersibility, as is commonly employed in conventional magnetic recording, may also be used. In addition, magnetic oxides with a thicker layer of lower refractive index oxide or other material having a lower optical scattering cross-section as described in U.S. Pat. Nos. 5,217,804 and 5,252,444 may also be used.

For the photographic element described in U.S. Pat. No. 5,395,743, cobalt surface treated gamma iron oxide is preferred.

The binders used in the magnetic layer in combination with the dispersant-cobinder include, for example, vinyl chloride-vinyl acetate copolymers, vinyl chloride-vinyl acetate-vinyl alcohol copolymers, vinyl chloride-vinyl acetate-maleic acid copolymers, vinyl chloride-vinylidene chloride copolymers, vinyl chloride-acrylonitrile copolymers, acrylic esteracrylonitrile copolymers, acrylic ester-vinylidene chloride copolymers, methacrylic ester-vinylidene chloride copolymers, methacrylic ester-styrene copolymers, thermoplastic polyurethane resins, phenoxy resins, polyvinyl fluoride, vinylidene, chloride-acrylonitrile copolymers, butadiene-acrylonitrile copolymers, acrylonitrile-butadiene-acrylic acid copolymers, acrylonitrile-butadiene-methacrylic acid copolymers, polyvinyl butyral, polyvinyl acetal, cellulose derivatives, styrene-butadiene copolymers, polyester resins, phenolic resins, epoxy resins, thermosetting polyurethane resins, urea resins, melamine resins, alkyl resins, urea-formaldehyde resins and the like.

In U.S. Pat. No. 5,395,743, cellulose derivatives are preferred. These include cellulose esters, such as, cellulose acetate, cellulose diacetate, cellulose triacetate, cellulose acetate butyrate, cellulose acetate propionate, and the like. Cellulose diacetate is the most preferred binder.

It will be readily appreciated that a transparent magnetic layer as described in U.S. Pat. No. 5,395,743 may be used as a lamination layer for an identification document, the particular selection of materials being chosen in accordance with that application.

FIGS. 1 and 2 illustrate an identification page 10 of a current European standard British passport. Page 10 is formed in the back cover 11 (FIG. 2) of the passport document and comprises a substrate 12 on which pre-printed titles 14, 16 and section descriptors 18, 20, 22, 24, 26, 28, 30, 32, 34, 36, 38, 40, 42, 44 are provided. A photographic image 46 of the holder of the passport is adhered to the substrate 12 as shown. The photographic image 46 is normally attached to the substrate using a heat-sensitive adhesive.

Descriptor 18 indicates the type of document. The code of the issuing state is given at 20 and a passport number is recorded at 22.

Details of the holder of the passport are printed in the section descriptors 24, 26, 28, 30, 32, 34, 36, 38, 40, 42, 44, for example, surname, 24, given name, 26, nationality, 28, date of birth, 30, number of children, 32, sex, 34, place of birth, 36, date of issue, 38, the issuing authority, 40, expiry date, 42, and observations 44.

The passport number and other details of the holder are also recorded in machine-readable characters separately, shown generally by numeral 48, on the substrate 12.

The substrate 12 is covered with a transparent glossy laminate 50, as shown in FIG. 2, for protection and to reduce the ease with which the identification page can be damaged or altered. The substrate 12 also includes watermarks which are formed therein, the watermarks being readable only using ultraviolet radiation.

In a preferred embodiment of the present invention, an applicant for a passport is photographed with a digital camera in a booth, for example, and his/her details entered electronically into an application form using a keyboard and display provided in the booth. An electronically-captured signature from a signature pad can also be entered. The digital image of the applicant together with his/her details are sent to the Passport Office for temporary storage, via a modem, whilst the application is verified.

When the application is approved, the image for the passport is printed from the digital image on a thermal printer, ideally on a thermal print material which includes a low concentration of magnetic particles. The magnetic particles may be in any suitable layer of the thermal print material, for example, the receiving layer, the transparent laminate layer, or the substrate layer.

The digital image is also compressed so that it can be recorded in the low concentration magnetic medium as a record which cannot be viewed optically.

Before, during or after printing of the digital image, the compressed image data is encoded and recorded in the low concentration magnetic medium of the thermal print material.

The print is then mounted in the passport, which by then has the machine-readable details added, and the whole laminated according to current practice.

When the passport is presented for identification, the magnetic image recorded in image 46 is read by a suitable reader, preferably, a magneto-resistive head, and a decompression algorithm is applied to generate a display on a computer used by an Immigration Officer for checking the presenter of the passport with the visible image on the identification page 10.

Furthermore, on inspection, a code-word is generated from the recorded compressed image data in accordance with a predetermined algorithm. The algorithm used in a particular instance is selected from a 'library' of such algorithms, and is determined at the inspection point at the time of inspection. The result of the application of the selected algorithm to the compressed image data is sent to the Passport Office central computer, together with the same selected algorithm, so that a comparison can be carried out between the code-word generated at the inspection point and the code-word generated from the data stored in the database using the same algorithm. This provides an indication of whether the passport is false, if either the image does not exist or the codes do not match, or genuine.

This invention can be used for any document where identification is needed but where additional visible means of identification are either not possible because of additional constraints, or not wanted because of providing an illegal holder of the document with the necessary information to assist him/her to look like the genuine holder.

If it is not possible or convenient to use a digital camera for the face picture, the picture can be generated by conventional means, that is, standard photography, the image produced being scanned to provide a digital image which can be processed and recorded in accordance with the present invention.

If it is not possible or convenient to use thermal printers to produce the picture, conventional photographic prints can be used. In this case, the magnetic particles may be dispersed within the photographic material itself.

Alternatively, the low concentration magnetic medium may be dispersed, still transparently, in the lamination material 50 which covers the substrate 12 once the identification page 10 has been produced.

It will be readily appreciated that magnetic particles may be provided elsewhere in the body of the passport. This may be in addition to the presence of magnetic material in the picture image or the lamination as described above.

There are at least four places where compressed image data can be recorded magnetically. For example, the data can be stored within the material on which the holder's photographic image is stored, within the material of the lamination applied to the page, within the material of the cover page or by using magnetic inks, in the printed type on a given page of the passport.

Moreover, the present invention is not limited to obtaining information relating to an applicant for a passport using a booth as described above. Conventional application methods can still be used, for example, the submission of photographs and an application form, the method of the present invention being implemented by scanning the submitted photograph to generated the digital image data required.

Although the present invention has been described with reference to a visual image of the person to whom the identification document relates being recorded in magnetic material within an identification document, it will be readily appreciated that an image of any other suitable personal identifier can be used, for example, a signature or a thumbprint.

I claim:

1. A method of recording an image of a unique personal identifier of a person on an identification document, the identification document including a region onto which the image is recorded in photographic form, the method comprising the steps of:

a) capturing an image of the unique personal identifier of the person to whom the identification document relates in digital form;

b) compressing the digital image captured in step a); and c) recording the digital image compressed in step b) in the said region of the document;

wherein said region includes a magnetic medium whose presence does not affect the visual appearance of the photographic image recorded in the document.

2. A method according to claim 1, wherein the magnetic medium comprises magnetic particles formed on or in a thermal printer material.

3. A method according to claim 1, wherein the magnetic medium comprises magnetic particles formed in photographic material.

4. A method according to claim 1, wherein the magnetic medium comprises magnetic particles formed in a laminating material.

5. A method according to any one of the preceding claims, wherein the magnetic medium comprises printing inks used to print the identification document.

6. A method according to claim 1, wherein the unique personal identifier comprises an image of the person to whom the identification document is issued.

7. A method according to claim 1, wherein the unique personal identifier comprises a signature of the person to whom the identification document is issued.

8. A method according to claim 1, wherein the unique person identifier comprises a thumbprint of the person to whom the identification document is issued.

9. A method according to claim 1, wherein the compressed image includes a code-word which is derived in accordance with a predetermined rule.

10. A method according to claim 1, wherein step a) is carried out using a digital camera.

11. A method according to claim 1, wherein step a) comprises digitally scanning a print, negative or transparency bearing a photographic image of the unique personal identifier of the person to whom the identification document relates.

12. An identification document including a compressed digital image of a unique personal identifier of a person to whom the document relates recorded in a magnetic medium in a region of the document that contains a photographic image of the identifier.

13. A document according to claim 12, wherein the unique personal identifier comprises an image of the person to whom the identification document is issued.

14. A document according to claim 12, wherein the unique personal identifier comprises a signature of the person to whom the identification document is issued.

15. A document according to claim 12, wherein the unique personal identifier comprises a thumbprint of the person to whom the identification document is issued.

* * * * *